US010841288B2

(12) United States Patent
Thomas et al.

(10) Patent No.: US 10,841,288 B2
(45) Date of Patent: Nov. 17, 2020

(54) CLOUD KEY MANAGEMENT FOR AFU SECURITY

(71) Applicant: Intel Corporation, Santa Clara, CA (US)

(72) Inventors: Brent D. Thomas, Chandler, AZ (US); Eric Innis, Hillsboro, OR (US); Raghunandan Makaram, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 240 days.

(21) Appl. No.: 16/017,770

(22) Filed: Jun. 25, 2018

(65) Prior Publication Data

US 2019/0044731 A1 Feb. 7, 2019

(51) Int. Cl.
*H04L 29/06* (2006.01)
*H04L 9/32* (2006.01)
*H04L 9/30* (2006.01)
*H04L 9/08* (2006.01)

(52) U.S. Cl.
CPC ............ *H04L 63/062* (2013.01); *H04L 9/088* (2013.01); *H04L 9/0819* (2013.01); *H04L 9/0897* (2013.01); *H04L 9/30* (2013.01); *H04L 9/3242* (2013.01); *H04L 9/3273* (2013.01); *H04L 63/029* (2013.01); *H04L 63/0478* (2013.01)

(58) Field of Classification Search
CPC ......... H04L 9/0819–0836; H04L 9/088; H04L 9/0897; H04L 9/30; H04L 9/3242; H04L 9/3273; H04L 63/029; H04L 63/0442–045; H04L 63/0478; H04L 63/061–064
See application file for complete search history.

(56) References Cited

U.S. PATENT DOCUMENTS

| | | | | |
|---|---|---|---|---|
| 2002/0129235 A1* | 9/2002 | Okamoto | ............... | G06Q 30/02 713/150 |
| 2008/0095374 A1* | 4/2008 | Schreyer | ............... | H04L 63/062 380/282 |
| 2015/0372810 A1* | 12/2015 | Miller | ................. | G06F 3/04883 713/183 |

\* cited by examiner

*Primary Examiner* — Kevin Bechtel
(74) *Attorney, Agent, or Firm* — Schwabe, Williamson & Wyatt, P.C.

(57) ABSTRACT

An apparatus for cloud key management may include a networking interface, a memory, and a processor, coupled to the memory and the networking interface, the networking interface to couple the apparatus to one or more endpoint servers (EPSs) of a cloud service provider (CSP), each EPS including a hardware accelerator, and a management node (MN) of the CSP. The apparatus may further include an accelerator functional unit (AFU) developer interface module operated by the processor to receive cryptographic material (CM) for each of one or more AFU developers (AFUDs) and store it into the memory, the CM includes a public key hash (PKH), and an encryption key (EK) to decrypt an AFU of the AFUD. The apparatus may also include an EK communication module operated by the processor to: receive, from the MN, a request to send to a targeted EPS an encrypted lookup table (LUT), the LUT including PKHs and associated EKs for a set of the one or more AFUDs from which the targeted EPS is authorized to receive AFUs, and in response to the request, send, to the targeted EPS, the LUT.

13 Claims, 9 Drawing Sheets

CLOUD KEY MANAGEMENT FOR AFU SECURITY

FIELD

Embodiments of the present disclosure relate to information or intellectual property (IP) security, and in particular to cloud key management for Accelerator Functional Unit (AFU) security.

BACKGROUND

AFUs, such as, for example, Field Programmable Gate Array (FPGA) bit-streams, have value to AFU developers, those that deploy them and users. As such, developers may choose to encrypt their AFUs, which generally requires a developer to share an encryption key with a cloud service provider (CSP) deploying the AFU. The CSP, which may support AFUs from multiple sources, may then need to manage and establish security schemes to support key usage. While some CSPs may utilize a cloud based Key Management Service (KMS) to provision key material and store keys in a secure database, these keys are typically clear-text when in use in server dynamic random access memory (DRAM) and/or central processing unit (CPU) registers. Thus, current KMSs do not support a secure mechanism to deploy AFU related keys.

DETAILED DESCRIPTION

Figure 1:
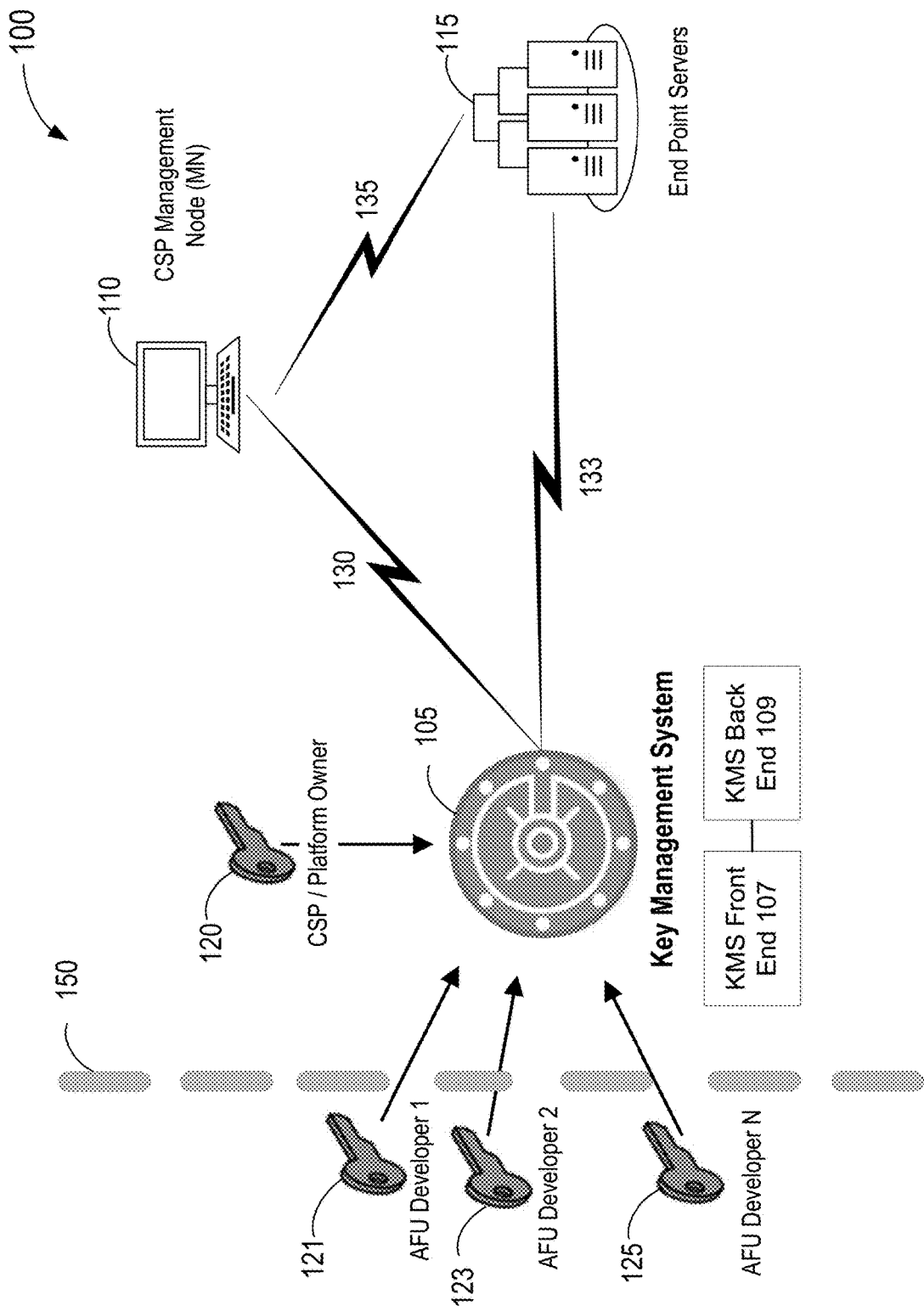
FIG. 1 illustrates an example cloud key management system, in accordance with various embodiments.

In embodiments, an apparatus for cloud key management may include a networking interface, a memory, and a processor, coupled to the memory and the networking interface, the networking interface to couple the apparatus to one or more endpoint servers (EPSs) of a cloud service provider (CSP), each EPS including a hardware accelerator, and a management node (MN) of the CSP. In embodiments, the apparatus may further include an accelerator functional unit (AFU) developer interface module operated by the processor to receive cryptographic material (CM) for each of one or more AFU developers (AFUDs) and store it into the memory, the CM includes an authorization public key hash (PKH), and an encryption key (EK) to decrypt an AFU of the AFUD. The apparatus may also include an EK communication module operated by the processor to: receive, from the MN, a request to send to a targeted EPS an encrypted lookup table (LUT), the LUT including PKHs and associated EKs for a set of the one or more AFUDs from which the targeted EPS is authorized to receive AFUs, and in response to the request, send, to the targeted EPS, the LUT.

In embodiments, one or more non-transitory computer-readable storage media may comprise a plurality of bits to configure a hardware accelerator (HA) disposed in an EPS of a CSP, the EPS coupled to an MN of the CSP and a key management system (KMS) of the CSP, to receive, at the HA, from the MN, an authorization hash table (AHT). In embodiments, the AHT may include at least a set of public key hashes of AFUDs whose AFUs are authorized to be run on the HA. In embodiments, the HA may be further configured to store the AHT on the HA, determine, as to each AFUD identified in the AHT, if the HA has a stored EK with which to decrypt an AFU of the AFUD, and in response to a determination that is does not have the EK, request the EK for the AFUD from the MN.

In embodiments, a method may be performed by a MN of a CSP, the MN coupled over a network to a KMS and to one or more EPSs of the CSP. In embodiments, the method may include generating, by the MN, a whitelist, the whitelist to indicate a set of the one or more EPSs that the KMS, coupled over the network to the one or more EPSs, is allowed to send an EK to, the EK to be used to decrypt associated encrypted AFUs to be respectively provided to the CSP by AFUDs. In embodiments, the AFUs may program a HA disposed in each EPS identified in the set, and the method may further include transmitting, by the MN, the whitelist to the KMS.

In the description to follow, reference is made to the accompanying drawings which form a part hereof wherein like numerals (or, as the case may be, the last two digits of an index numeral) designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that various embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM) (both volatile (DRAM) and non-volatile (NVRAM or NVM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, an in-vehicle computing system, a navigation system, an autonomous driving system, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

As used hereinafter, including the claims, the terms "module", or "user interface", may refer to, be part of, or include one or more Application Specific Integrated Circuits (ASIC), electronic circuits, programmable combinational logic circuits (such as field programmable gate arrays (FPGA)) programmed with logic to perform operations described herein, a processor (shared, dedicated, or group) and/or memory (shared, dedicated, or group) that execute one or more software or firmware programs generated from a plurality of programming instructions with logic to perform operations described herein, and/or other suitable components that provide the described functionality.

The present disclosure addresses, inter alia, at least two concerns. First, the expectation of accelerator (e.g., FPGA) developers, or AFUDs, that their bit-stream intellectual property be protected by a CSP management module who they may select to deploy it, and second, a CSP's desire to control what executes within its public/private/hybrid cloud infrastructure (which, it is noted, may increasingly include FPGA bit-streams).

In accordance with various embodiments, to enable acceleration in the cloud, such as, for example, FPGA based acceleration, a scalable mechanism that may be easily deployed by all involved entities, e.g., an accelerator developer and a CSP that the developer engages, may be implemented. In embodiments, a given accelerator may have an integrated trusted agent. For example, an FPGA may have an integrated secure device manager (SDM) to run secure key exchange flow. It is here noted that a SDM may be a microprocessor block that may provide a robust, secure, and fully authenticated configuration scheme, thereby allowing users to customize device configuration.

It is here noted that various CSPs have developed means to provision key material via a cloud KMS. In general, a KMS stores keys in a secure database, which may be either software or hardware based, and applications that use these keys may encrypt them before storing to disk. However, these keys are typically clear-text when in use in server DRAM and/or CPU registers. Moreover, such cloud KMSs do not support a secure mechanism to deploy AFU related keys. This may lead to potential exposure of this sensitive material, which is a key vulnerability addressed by various embodiments hereof.

In accordance with various embodiments, AFU developers may dictate the confidentiality of their intellectual property, e.g., AFUs, and CSP based (or other) deployment models of AFUs may be secure and scalable. In accordance with such embodiments, several security requirements may be supported. Thus, in embodiments, AFU Developers (AFUDs) may securely provision asymmetric and/or symmetric keys for encrypting and decrypting the AFUs that they may deploy. In embodiments, the AFUDs may both encrypt and digitally sign their AFUs. In embodiments, an AFUD's cryptographic materials may be isolated from those of other AFUDs. In embodiments, a CSP may securely control the deployment of AFUs within its infrastructure. In embodiments, a scalable solution to the secure deployment of AFUs in an environment of limited trust may thus be provided.

In what follows, various embodiments may be referred to as performing or implementing "cloud key management (CKM)." It is here noted that, in accordance with various embodiments, three main entities may collaborate in a CKM system. These include a KMS of a CSP, a MN of a CSP, and EPSs of the CSP.

In embodiments, one or more AFUDs may provision their cryptographic information to a KMS of a CSP cloud or infrastructure. In embodiments, the CSP may also identify a set of valid EPSs in its infrastructure, and provide a list of the valid EPSs to the KMS. In embodiments, this list may be used by the KMS to ensure that the KMS may only release the key material to the valid EPSs. In embodiments, the CSP may determine the set of authorized sources of AFU images that may be deployed on any given EPS, which it may select, and may therefore distribute a table of public key hashes identifying those AFU sources, e.g., AFUDs, to the EPS. If the associated key material (e.g., symmetric or asymmetric encryption keys) is not already available at the EPS, the EPS may request a CSP MN for provisioning of the needed key material. In response to such a request, the CSP management node may send a request to the KMS (e.g., a back end module of the KMS, or "KMS-BE") to send encrypted meta-data (EMD) to the requesting EPS. It is here noted that in the request from the MN to the KMS, the EPS in question is said to be "targeted." As a result, the requesting server may sometimes be referred to herein, especially when described from the point of view of the MN and/or the KMS, as the "targeted EPS."

In embodiments, the EMD sent by the KMS-BE may include public key hashes and associated symmetric encryption keys for one or more AFUDs. In response to the MN's request for missing key material, the KMS, prior to sending the EMD, may, for example, determine if the requesting EPS is a valid EPS. If it is valid, then the KMS-BE may establish a secure communication tunnel to the EPS, and may use this secure tunnel to send EMD with the relevant key material to the targeted EPS.

FIG. 1 illustrates an example CKM system. With reference to FIG. 1, there are three major entities that may be involved, in accordance with various embodiments. These may include, for example, KMS 105 (which may include Front End 107 (KMS-FE), and Back End 109 (KMS-BE)), CSP MN 110, and networked accelerator enabled EPSs 115. ESPs 115 may be implemented, for example, as an Intel Xeon™ Scalable Processor With Integrated FPGA, in some embodiments, or a similar processor in others, for example. With reference to FIG. 1, dashed vertical line 115 represents the boundary between a CSP public/private or hybrid cloud, on the right of line 115, and independent AFUD environments on the left of line 115.

Continuing with reference to FIG. 1, in accordance with some embodiments, KMS 105 may, for example, further include a hardware security module (HSM), which may, as described in detail below, collect EKs in response to a request by an EPS. Thus, in those embodiments, the EK collection and LUT generation processes may be kept within the domain of the HSM on the KMS, for added security. In embodiments, KMS 105 may include a "front-end" module (KMS-FE), that may, for example, interface with AFUDs to provision their respective cryptographic material (CM), including Public Key Hash ($H_{XAU}$) and Soft IP symmetric key ($K_{SIPX}$), where 'X' identifies a given AFUD, such as, for example, AFUD 1 121, AFUD 2 123, or AFUD N 125.

Continuing with reference to FIG. 1, in accordance with various embodiments, CSP MN 110 may facilitate the establishment of EPS whitelist tables, and create and distribute AHTs to both EPSs 115 and KMS-BE 109. In embodiments, an EPS whitelist may identify all valid EPSs of the CSP. In embodiments, an AHT may perform two functions. First, at EPSs, it may identify allowed active sources of AFU images that may be loaded. Second, at a KMS-BE 109, it may identify the set of encryption key ($K_{SIPX}$) values that the KMS may collect and distribute to a targeted EPS.

Continuing further with reference to FIG. 1, in accordance with various embodiments, EPSs 115 may, for example, include a network of FPGA (or other accelerator) attached servers linked to MN 110 over link 135, and linked to KMS-BE 109 over link 133. It is noted that a "sever" as used herein, may refer to any CPU that is connected to an accelerator. In embodiments, EPSs 115 may be capable of Digital Signature Signing (DSS), Digital Signature Verification (DSV) and block based Encryption (AES) and Hashing. In embodiments, EPSs 115 may use a received AHT to dictate authorized sources of AFU images that they may load.

Given the three primary entities of a CKM system as shown in FIG. 1, it is noted that, in embodiments, the various interconnects amongst them may support secure communication. For ease of description, a shorthand will be used to identify an interconnect or link between entity A and entity B, as $I_{AB}$. Thus, for example, using this shorthand, $I_{105, 110}$ identifies the interconnect between KMS 105 and MN 110. Moreover, Table 1 below defines exemplary security attributes of the various interconnects depicted in FIG. 1, in accordance with various embodiments. In Table 1, security attributes of $I_{105,110}$ may be expressed as "$SA_{105,110}$."

TABLE 1

Interconnect Security Attributes

| Security Attribute | Interconnect | Commentary |
|---|---|---|
| $SA_{110, 105}$ | I | Data integrity at a minimum |
| $SA_{105, 115}$ | I plus C | Data integrity and confidentiality at a minimum |
| $SA_{110, 115}$ | I | Data integrity at a minimum |

In embodiments, various central security requirements may be implemented, which may include the following. An AFUD may securely provision asymmetric and/or symmetric keys for use with their AFUs. AFUDs may encrypt and digitally sign their AFUs. A given AFUD's cryptographic material may be isolated from that of other AFUDs, and a CSP may securely control the deployment of AFU(s) within their infrastructure. Thus, in embodiments, a CKM may provide a scalable solution to the secure deployment of AFUs in an environment of limited trust.

Thus, in accordance with various embodiments, an AFU developer may control their own cryptographic material, and may not need to disclose its encryption keys to a CSP or any other entity. Moreover, in embodiments, AFU encryption keys may not appear as plain-text (clear-text) in DRAM or CPU registers, multi-tenancy (MT) may be supported, and scalability for cloud deployment may be provided.

Figure 2:
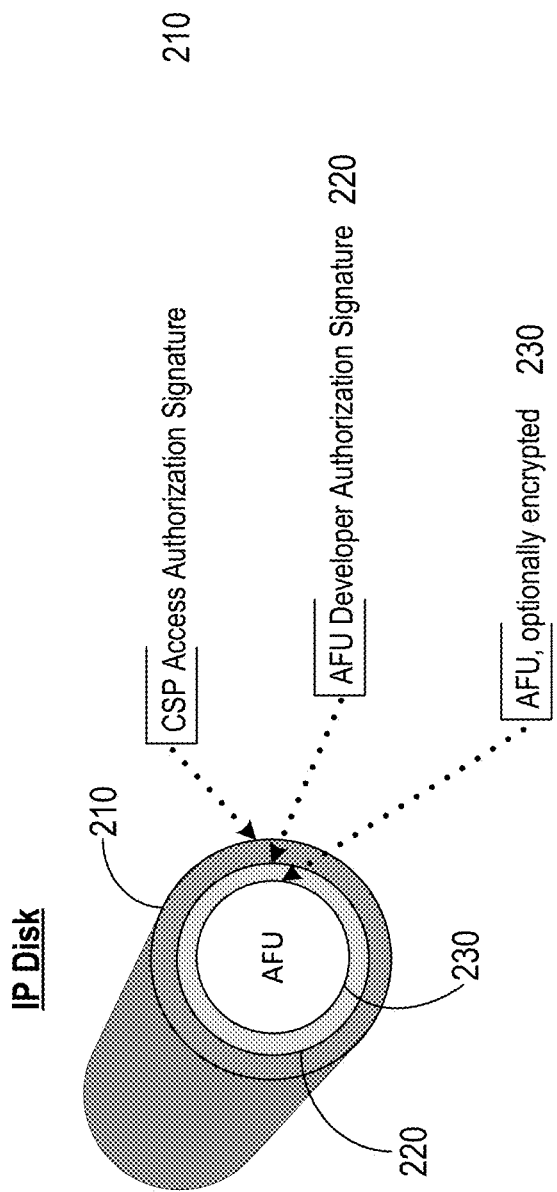
FIG. 2 illustrates an example hierarchy of encryption for an AFU, in accordance with various embodiments.

In embodiments, an AFU image may be treated as a secured object of multiple layers within a CKM system. This layering may, for example, allow AFUDs to secure and manage their respective AFUs independent of others' AFUs, while, at the same time, allow a CSP or other platform to control what may run on their respective infrastructures. This is illustrated, for example in FIG. 2. With reference to FIG. 2, three layers of protection for an example AFU are shown. The AFU 230 may be encrypted by its AFUD using an AFUD specific encryption key. On top of this encrypted layer, the AFUD may sign the material with an AFUD authorization signature 220. Finally, any such doubly secured file, once in the domain of an example CSP, may be further signed by the CSP (or other platform).

In the description that follows, a CKM system according to various embodiments may be conveniently conceptualized as including five main tasks or steps (in other conceptualizations these tasks may be grouped as more, or fewer, main tasks). For example, the tasks may include Registration and Provisioning (FIG. 3), Whitelist Creation (FIG. 4), Whitelist Distribution (FIG. 5), Authorization Hash Table Distribution (FIG. 5) and EMD Request and Completion (FIG. 5). These tasks are next described with reference to the indicated figures.

Figure 3:
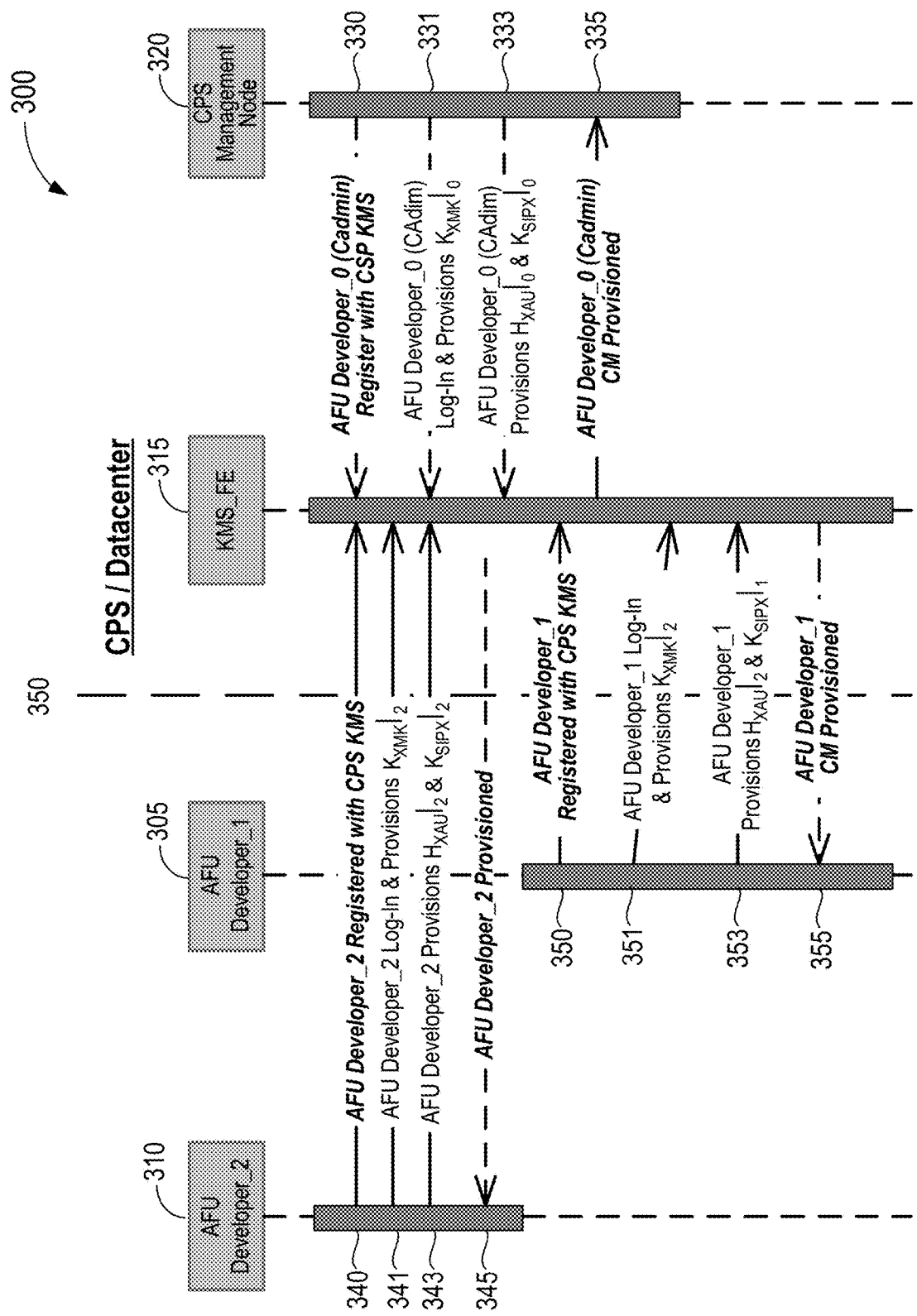
FIG. 3 illustrates an overview of the communications and interactions between example AFU developers, an example KMS and an example CPS management node (MN) pursuant to a provisioning process, in accordance with various embodiments.

FIG. 3 illustrates example messaging between various entities for registration and provisioning of AFUDs within an example CKM system. "Registration", as used herein, refers to a CSP facilitating the registration of AFUDs to the CSP's KMS resource. Once an AFUD has registered via, for example, a KMS-FE, then they are able to provision their respective data and cryptographic material to the KMS and/or KMS-HSM, as the case may be. In embodiments, an AFUD may be designated generally as AFUD 'X', where X may have a value of N, where N={1, 2, 3, . . . }. AFUDX may provision at least three pieces of material: a Master Key ($K_{XMK|N}$), a public key hash ($H_{XAU|N}$) and a soft IP (e.g., AFU) encryption key ($K_{SIPX|N}$). In embodiments, this data may be provisioned with mutual integrity, and privacy maintained, via a KMS-FE, such as KMS-FE 107 of FIG. 3, for example.

Continuing with reference to FIG. 3, each of AFUD 2 310, AFUD 1 305, and CPS MN 320 are shown as registering with KMS-FE 315, and, following registration, provisioning their master key ($K_{XMK|N}$), followed by their public key hash ($H_{XAU|N}$) and a soft IP (e.g., AFU) encryption key ($K_{SIPX|N}$). It is noted that the MN 320 is treated, for the purposes of registration and provisioning, as AFUD 0, even though it is not an actual AFUD.

Thus, at 330, AFUD 0 320 may register with the KMS, via KMS-FE 315. At 331 AFUD 0 may log in, and may provision its master key ($K_{XMC|0}$), and at 333 it may provision its public key hash ($H_{XAU|0}$) and a soft IP (e.g., AFU) encryption key ($K_{SIPX|0}$). In response to these actions, at 335, KMS-FE 315 may send to AFUD 0 320, a confirmation that it has been provisioned. Similarly, at 340, AFUD 2 310 may register with the KMS, via KMS-FE 315. At 341 AFUD 2 may log in, and may provision its master key ($K_{XMK|2}$), and at 343 it may provision its public key hash ($H_{XAU|2}$) and a soft IP encryption key ($K_{SIPX|2}$). In response to these actions, at 345, KMS-FE 315 may send to AFUD 2 315, a confirmation that it has been provisioned. Finally for this example, and further similarly, at 350, AFUD 1 305 may register with the KMS, via KMS-FE 315. At 351 AFUD 1 may log in, and may provision its master key ($K_{XMK|1}$), and at 353 it may provision its public key hash ($H_{XAU|1}$) and a soft IP encryption key ($K_{SIPX|1}$). In response to these actions, at 355, KMS-FE 315 may send to AFUD 1 305, a confirmation that it has been provisioned. In accordance with various embodiments, an analogous messaging process would occur for any additional AFUDs (not shown).

Figure 4:
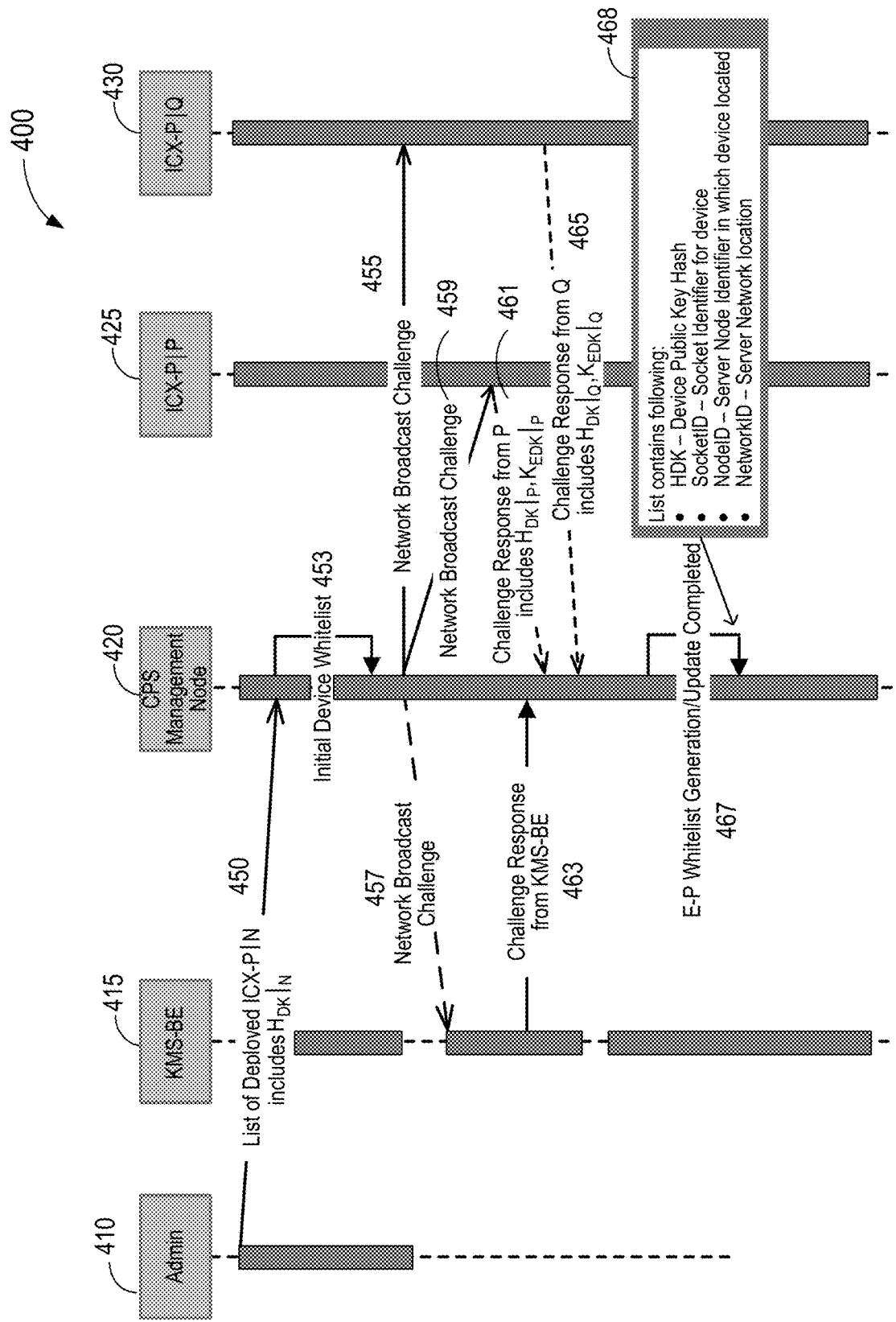
FIG. 4 illustrates an overview of the communications and interactions between an example CSP administrator, an example KMS, a CPS management node (MN), and example end-point servers (EPSs) pursuant to a whitelist generation process, in accordance with various embodiments.
Figure 5:
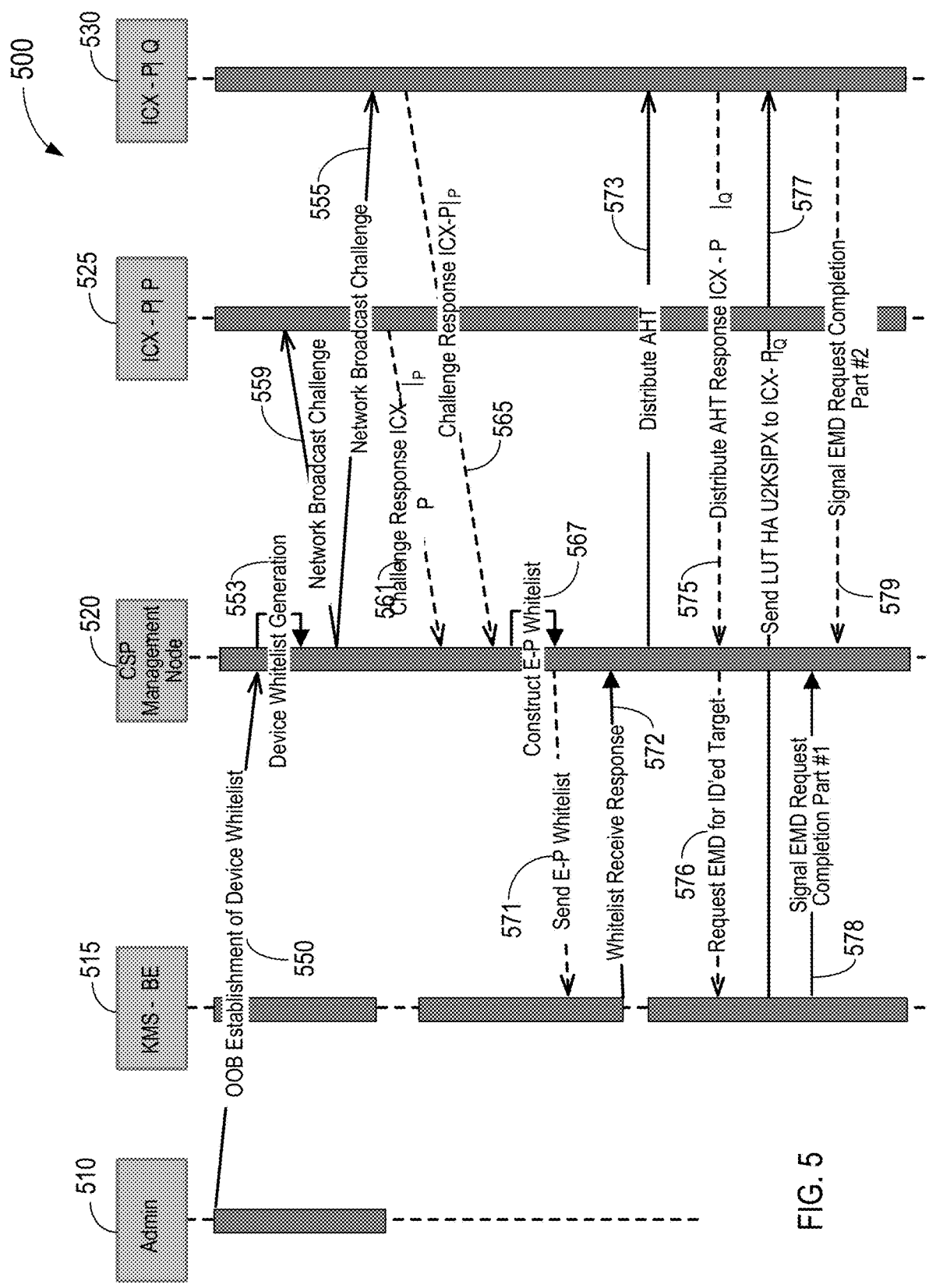
FIG. 5 illustrates an overview of the communications and interactions between the example entities of FIG. 4 pursuant to process including whitelist distribution by a MN to a KMS, hash table authorization distribution by the MN to EPSs, a request for encryption key(s) (EK) by an EPS, and transmittal of a look up table (LUT) by the KMS to the requesting EPS, in accordance with various embodiments.

Next described, with reference to FIG. 4, is creation and maintenance of whitelists in accordance with various embodiments. FIG. 4 illustrates various interactions and messaging associated with generation of an EPS whitelist in an example CKM system. It is noted that, in embodiments, there may be two whitelists, for example, that may be created and used in an example CKM system. These whitelists may include a device whitelist and an EPS whitelist. It is further noted that, as referred to herein, the term "creation" corresponds to an initial establishment of a whitelist, while the term "maintenance" may be used to describe upkeep of a whitelist, including, for example, making additions to, or deletions from, the whitelist.

With reference to FIG. 4, in embodiments, an Initial Device Whitelist 453 may be generated at CPS MN 420. For example, an initial device list of deployed servers in the CSP may be created out-of-band (OOB) by an administrative node 410 of the CSP. In embodiments, this may be accomplished by logging the device public key hash ($H_{DK|N}$) associated with, for example, FPGA silicon in each deployed ICX-P or DCP server of the CSP. Once the device whitelist is created, Admin Node 410 may, for example, at 450, publish the device whitelist 453 to MN 420, where, for example, it may be used to establish an EPS Whitelist. For example, using the device whitelist, MN 420 may, for example, at 455 and 459 send a network broadcast or targeted transaction with a security challenge, including a random number (RN) defined by the MN, to each ESP on the device whitelist, here 425 and 430, as well as to KMS-BE 415, at 457.

Continuing with reference to FIG. 4, in response to each network broadcast challenge, a response to the challenge may be received, at 461 and 463, from ICX-P|P 425, and ICX-P|Q 430, respectively, and at 463, a response to the challenge from KMS-BE 415 may also be received. In the case of the challenge responses from ICX-P|P 425, and ICX-P|Q 430, the responses may each correspond to the challenge, and may each include, for example, the device's public key hash $H_{DK}$ and additional metadata signed by the device's unique private key. In embodiments, the additional metadata may include, for example, HDK—Device Public Key Hash, SocketID—Socket Identifier for device, NodeID—Server Node Identifier in which device is located, and NetworkID—Server Network location, as shown at 468 in FIG. 4. Thus, in embodiments, EPSs, e.g., ICX-P|P 425, and ICX-P|Q 430, whose message signature may be verified by the EPS's public key ($K_{EDK}$) corresponding to the device public key hash $H_{DK}$ which was set forth on the initial device whitelist 453 may be added to the EPS Whitelist 467 with accompanying meta-data.

FIG. 5 illustrates an overview of the communications and interactions between the same example entities of FIG. 4 pursuant to several follow-on processes to the whitelist generation processes shown in FIG. 4. Thus, elements 550-567 of FIG. 5 correspond directly to elements 450-467 of FIG. 4, respectively, and will not be further explained. FIG. 5 adds to the messaging and interactions illustrated in FIG. 4, what occurs following the construction of EPS Whitelist at 567.

Continuing with reference to FIG. 5, at 571 the EPS Whitelist may be distributed by MN 520 to KMS-BE 515, and KMS-BE 515 may send a receipt confirmed message at 572. In embodiments, communications between MN 520 and KMS-BE 515 may preferably be mutually authenticated, and the EPS Whitelist may thus be exchanged with integrity at a minimum. Towards that end, in embodiments, KMS-BE 515 may accept transactions from only MN 520 and/or its proxies. Once the EPS Whitelist has been received by KMS-BE 515, it may then know the set of valid EPSs, within the CKM infrastructure, with which it is allowed to communicate.

In embodiments, an optional auditing step may also be performed, once the EPS Whitelist has been transferred to KMS-BE 515. For example, in some embodiments a "golden device public key hash" (GDPKH) list may be searched for existence of the HECK from the EPS Whitelist in that list. In embodiments, this auditing step may detect any erroneous EPSs on the EPS Whitelist provided by the CSP, and may, for example, facilitate autonomous invalidation of an EPS Whitelist entry. If the device is not found in the GDPKH, then an autonomous "invalidation" of that devices entry in the EPS Whitelist may be performed. In embodiments where the auditing is done, existence on the list may be established in multiple ways, including, for example, comparing hash values, or verifying the signature on a known string. In such embodiments, for example, an auditor function may be performed by, for example, the KMS/HSM, a trusted third party or AFUDs.

Continuing with reference to FIG. 5, at 573 MN 520 may distribute an AHT to one or more ESPs. For example, as shown in FIG. 5, MN 520 may distribute an AHT to ICX-P|Q 530. As noted above, an AHT corresponds to a table of hashes constructed by the CSP to control the authorized sources of AFUs that may be potentially loaded to a given EPS. It is here noted that, in embodiments, if a subsequent EMD Request (e.g., Request 576) is to be generated, then a token may accompany the AHT to the targeted EPS (e.g., ICX-P|Q 530). In embodiments, such a token may be ephemeral, and may be generated by MN 520 or EPS 530. It is here re-iterated that, in embodiments, the only acceptable source of AHT data in a CKM compliant deployment may be the CSP MN 520. As a result, AHT may be signed by MN 520, and may, for example, be replay protected when sent to a given EPS. Additionally, in some embodiments, an AHT may preferably include version data per record element. In embodiments, this may allow the support of multiple keys per AFU Developer per valid authorization public key hash, $H_{XAU}$ (e.g., the hash for that AFUD provided in the AHT). In embodiments, once distributed to an EPS, a hash table with corresponding $K_{SIPX}$ associations, such as, for example, LUTHAU2KSIPX sent to ICX-P|Q at 577 in FIG. 5, may not be exposed outside an accelerator as clear-text.

Next described, still with reference to FIG. 5, is an EMD Request, response, and completion messaging. In embodiments, after sending the AHT to an EPS, for example, at 573, MN 520 may receive a response from the EPS to the effect that the EPS lacks an encryption key for one or more of the authorized AFUDs listed in the AHT. An example of this is shown at 575 in FIG. 5, where ESP ICX-P 530 distributes an AHT response to MN 520. Such a request may sometimes be referred to herein as an "AU-MISS" message, which refers to a missing EK for one of the authorized AFUDs. As shown in FIG. 5, although it is the KMS that has the needed EK, the request is made to MN 520, and MN 520 forwards it to KMS-BE 515. Thus, with reference to FIG. 5, at 576 MN 520 sends to KMS-BE 515 a "Request EMD for ID'd Target", which, in embodiments, may be a request for "encrypted metadata" (EMD), targeting an identified EPS, here for example, ICX-P|Q 530. The requested EMD may include an encrypted message with the missing encryption key, to be sent to the targeted EPS.

In embodiments, EMD Request 576 may include an AHT, an EPS Target, and a token. Once KMS-BE 515 verifies that the request originated from a valid CKM CSP MN, e.g., MN 520, it may check that the targeted EPS is, in fact, a valid EPS, using EPS Whitelist 567 (not shown in FIG. 5, but would occur right before the LUT is sent at 577 by KMS-BE). If yes, then KMS-BE 515 may then issue a request to the KMS, or in some embodiments, the KMS-HSM, to use the received AHT to look-up and correspondingly collect the soft IP keys ($K_{SIPX}$) associated with the corresponding $H_{XAU}$ (authorization public key hash) of the relevant AFUD. Once that is accomplished, in embodiments, a cross-reference look-up table LUT HAU×KSIPX containing $H_{XAU}$ by $K_{SIPX}$ may be produced and encrypted, thereby resulting in EMD.

In embodiments, the LUT, such as, for example, LUT HAU×KSIPX at 577 of FIG. 5. may, for example, be encrypted by an ephemeral secret ($K_{HSM}$). KMS-BE 515 and target EPS 530 may then establish a mutually authenticated private tunnel over which the $K_{HSM}$ may be encrypted by the tunnel session key, and the EMD may be passed with integrity. In embodiments, the execution phase may be completed once the EPS signals receipt of the payload, e.g., at 579 in FIG. 5, and the tunnel may be closed. A tokenized completion may be sent by the EPS to the MN after the EMD is processed at the EPS, such as, for example, by an FPGA SDM-CMF. In embodiments, KMS-BE may also signal a tokenized EMD Request completion to the CSP MN after the EMD is received by the EPS, as shown, for example, at 578 in FIG. 5. In embodiments, the reception of two tokenized EMD Request completions, from KMS-BE and a given EPS, both with the same token, may signal completion of the EMD Request.

Figure 6:
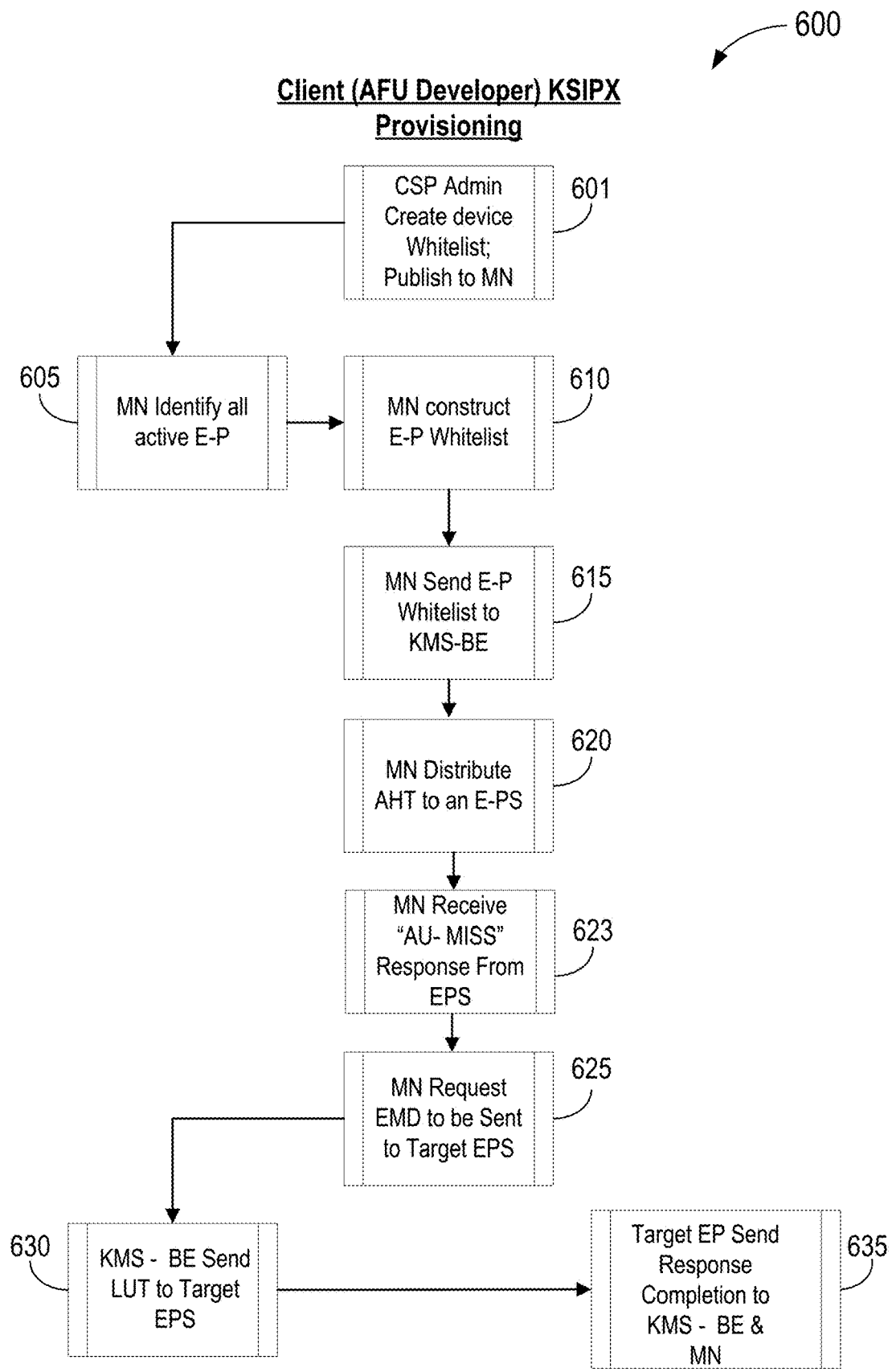
FIG. 6 illustrates an overview of the operational flow of the process illustrated in FIG. 5, in accordance with various embodiments.

Referring now to FIG. 6, which illustrates an overview of the operational flow of a process 600, that may be performed primarily by an MN, for whitelist and authorization hash table distribution, and for direct secure transmission of a LUT from a KMS to an EPS, in accordance with various embodiments. Process 600 may be understood as a summary of the detailed interactions and inter-entity messaging illustrated in the example CKM system of FIGS. 4 and 5, as described above. Process 600 may include blocks 601 through 635. In alternate embodiments, process 600 may have more or less operations, and some of the operations may be performed in a different order.

With reference to FIG. 6, process 600 may begin at block 601, where an example administrator of an example CSP may create a device whitelist and publish it to an MN of the CSP, such as, for example, MN 110 of FIG. 1. In embodiments, the device whitelist may include some or all of the EPSs then extant in the CSP, such as, for example, EPSs 115 of FIG. 1. As noted above, in embodiments, the device list may be created OOB by a CSP administrative node logging the device public key hash ($H_{DK}$) associated with FPGA silicon in some or all of the EPSs of the CSP.

From block 601, process 600 may proceed to block 605, where, having received the device whitelist, the MN may identify some or all of the listed EPSs as being active. As noted above with reference to FIG. 4, this may include sending a broadcast challenge to each EPS on the device whitelist.

From block 605, process 600 may proceed to block 610, where, following the identification of active EPSs in block 605, the MN may construct an EPS whitelist. From block 610, process 600 may proceed to block 615, where the MN may send the whitelist to a "back end" module of the KMS. The KMS may be, for example, KMS 105 of FIG. 1. As noted above with reference to FIG. 1, the "back end" module of a KMS may be to communicate with the MN and EPSs of a CSP (and a "front end" module of the KMS may be to communicate with AFUDs).

From block 615, process 600 may proceed to block 620, where the MN may distribute an AHT to an EPS. In embodiments, the AHT may include version data and a public key hash for each of one or more AFUDs which the EPS is authorized to receive AFUs from. In embodiments, the AHT may thus be the means by which the CSP provisions an AFUDs workload to ESPs. In embodiments, an AHT distributed to an EPS may be unique to that EPS.

From block 620, process 600 may proceed to block 623, where the MN may receive a response from the EPS to the effect that the EPS lacks an encryption key for one or more of the authorized AFUDs. For example, this may be an "AU-MISS" message, which refers to a missing EK for one of the authorized AFUDs.

From block 623, process 600 may proceed to block 625, where, in response to the "AU-MISS" message, the MN may request that an encrypted message be sent to the targeted EPS with the missing encryption key. This request may, for example, be equivalent to communication 566, "Request EMD for ID'd Target", illustrated in FIG. 5.

From block 625, process 600 may proceed to block 630, where, in response to the "Request EMD for ID'd Target" communication, the KMS' back end module may send a LUT with the required encryption key(s) to the requesting EPS. For example, the LUT may list a set of AFUDs and their encryption keys, as described above. It is here noted that as a security measure, the MN may forward the request from the EPS to the KMS, as, for example, only the MN (which is known to the KMS) may make such a request to the KMS. On the return side, the KMS may send the LUT directly to the EPS, as, for example, only the KMS has the encryption keys of the AFUDs.

From block 630, process 600 may proceed to block 635, where, upon receiving the LUT from the KMS, the EPS targeted in the MN's request at block 625 may send a response completion message to each of the KMS (via its back end communication module) and the MN. At 635, Process 600 may terminate.

Figure 7:
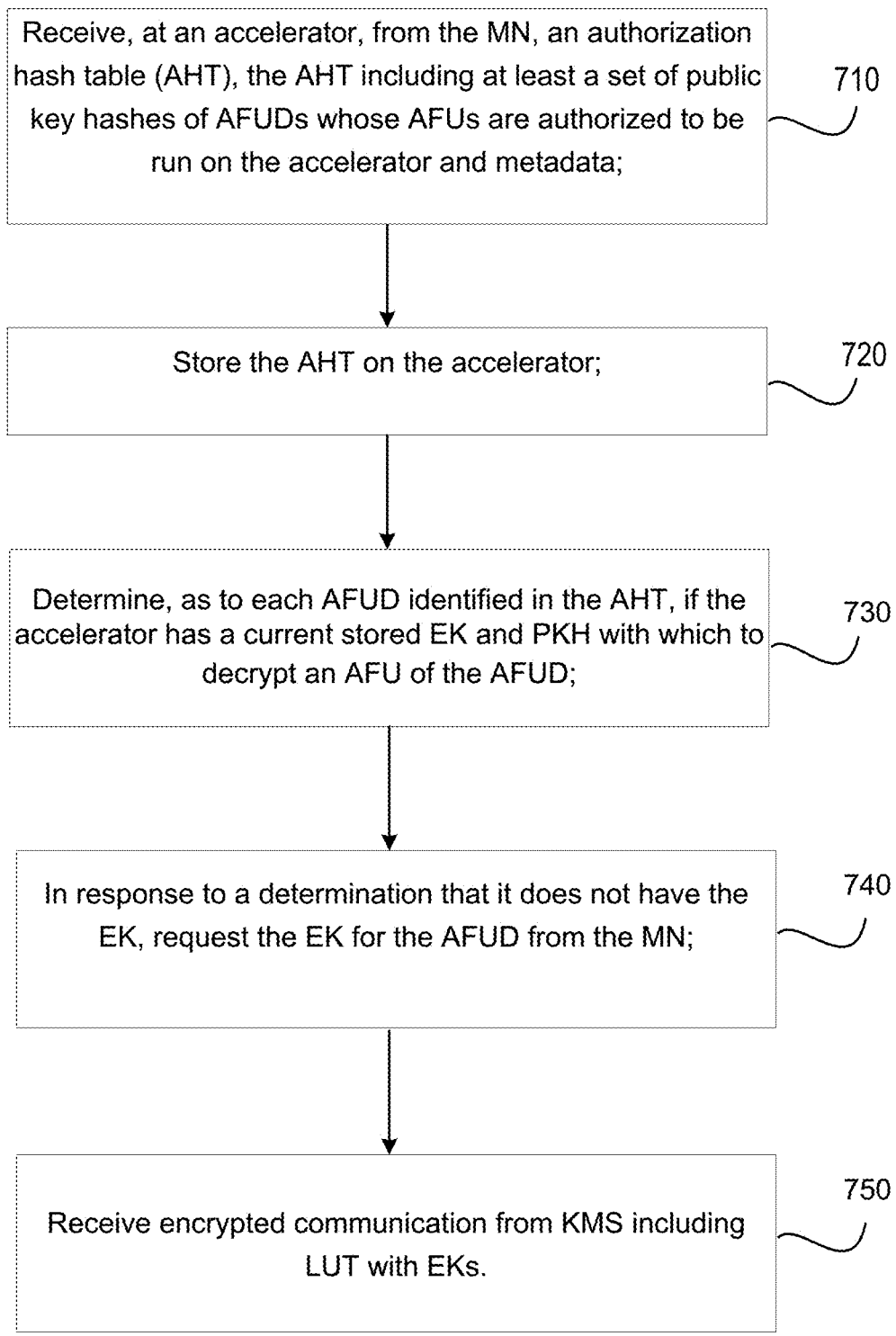
FIG. 7 illustrates an overview of the operational flow of a process performed at an EPS, in accordance with various embodiments.

Referring now to FIG. 7, which illustrates an overview of the operational flow of a process 700 performed at an EPS to obtain appropriate EKs to decrypt one or more AFUs to be provided by an AFUD, in accordance with various embodiments. Process 700 may include blocks 710 through 750. In alternate embodiments, process 700 may have more or less operations, and some of the operations may be performed in a different order.

With reference to FIG. 7, process 700 may begin at block 710, where an example EPS may, for example, receive, at an accelerator provided at the EPS, from an MN, an AHT. For example, the accelerator may include a FPGA, a graphics processor or graphics processing unit (GP-GPU), digital signal processors (DSPs), neural network processors, custom artificial intelligence (AI) processors, network processors or cryptographic processors. The AHT may include, as described above with reference to FIG. 5, at least a set of public key hashes of AFUDs whose AFUs are authorized to be run on the accelerator, as well as metadata, such as, for example, version data for those AFUs. In embodiments, the AHT may be the result of the CSP deciding how to provision a client's workload, once the client has provisioned its encryption keys in to a KMS of the CSP, and has then made a requisition for cloud accelerator services from the CSP.

From block 710, process 700 may proceed to block 720, where the EPS may store the AHT on the accelerator.

From block 720, process 700 may proceed to block 730, where, given the AFUDs listed in the AHT, the EPS may determine, as to each AFUD identified in the AHT, if the accelerator already has a stored EK with which to decrypt an AFU of the AFUD that is current, and an authorization PKH for that AFUD. It is here noted that, in general, if at block 710 this is the first time the ESP has received a AHT from the MN following a reset (e.g., power up), then the ESP may not have any stored EKs in the accelerator. On the other hand, if the AHT is an update, to add additional AFUDs, the ESP may likely already have EKs for AFUDs on the updated AHT. Still alternatively, because the AHT may preferably also include metadata such as, for example, version data, it may be that although the ESP does have a stored EK for a given AFUD, it may have timed out, and the ESP may need an updated EK in order to decrypt any AFUs form that AFUD.

From block 730, process 700 may proceed to block 740, where, in response to the determination at block 730 that it does not have an EK (or a current EK) and AHT for one or more AFUDs listed in the AHT stored in the accelerator, the EPS may request the EK(s) for the one or more AFUDs from the MN. In embodiments, as described above in connection with FIG. 5, the request may include the AHT that was received from the MN, as in block 710, described above.

From block 740, process 700 may proceed to block 750, where, in response to the request to the MN, the EPS may receive an encrypted communication from the KMS, including a LUT with the public hash key of each AFUD that the EPS is authorized to receive AFUs from, and an associated EK to decrypt those AFUs. Process 700 may then terminate.

Thus, given the various interactions and processes described above in FIGS. 3-7, which focus on interactions between a KMS, a MN and one or more EPSs of a CSP, an example flow from a client's point of view, e.g., a client of the example CSP may proceed as follows, in accordance with various embodiments.

The flow may begin when one or more client(s) may provision keys into a KMS of the CSP. Each of the one or more clients may then requisition cloud FPGA services from the CSP, to establish service for their client workloads. A MN of the CSP may, in response to the requisition(s), determine appropriate EPSs to provision for the client workloads. The MN may then send a necessary AHT update to each of the EPSs so provisioned. If current EKs for one or more of the clients are not present at an EPS, that EPS may then respond to the MN's AHT update with an "authorization missed" or "AU_MISS" message, such as is shown at 565 in FIG. 5. In response to the "AU-MISS" message, the MN may cause the KMS, which, in embodiments, may be a sole custodian of each client's EKs within the CSP, to send an updated LUT to each requesting ESP. At this point FPGA hardware at each designated EPS may have the necessary encryption key(s) to decrypt and load one or more AFUs of the client(s). Thus, a client application may run on any or all of the targeted EPSs, and the client may trigger or request to the CSP that its AFU(s) be loaded onto FPGA(s) at the provisioned EPSs. It is noted that, in embodiments, such a client request may go through an orchestration layer (e.g., OpenStack or Kubernetes), which may manage resources for a client application.

Figure 8:
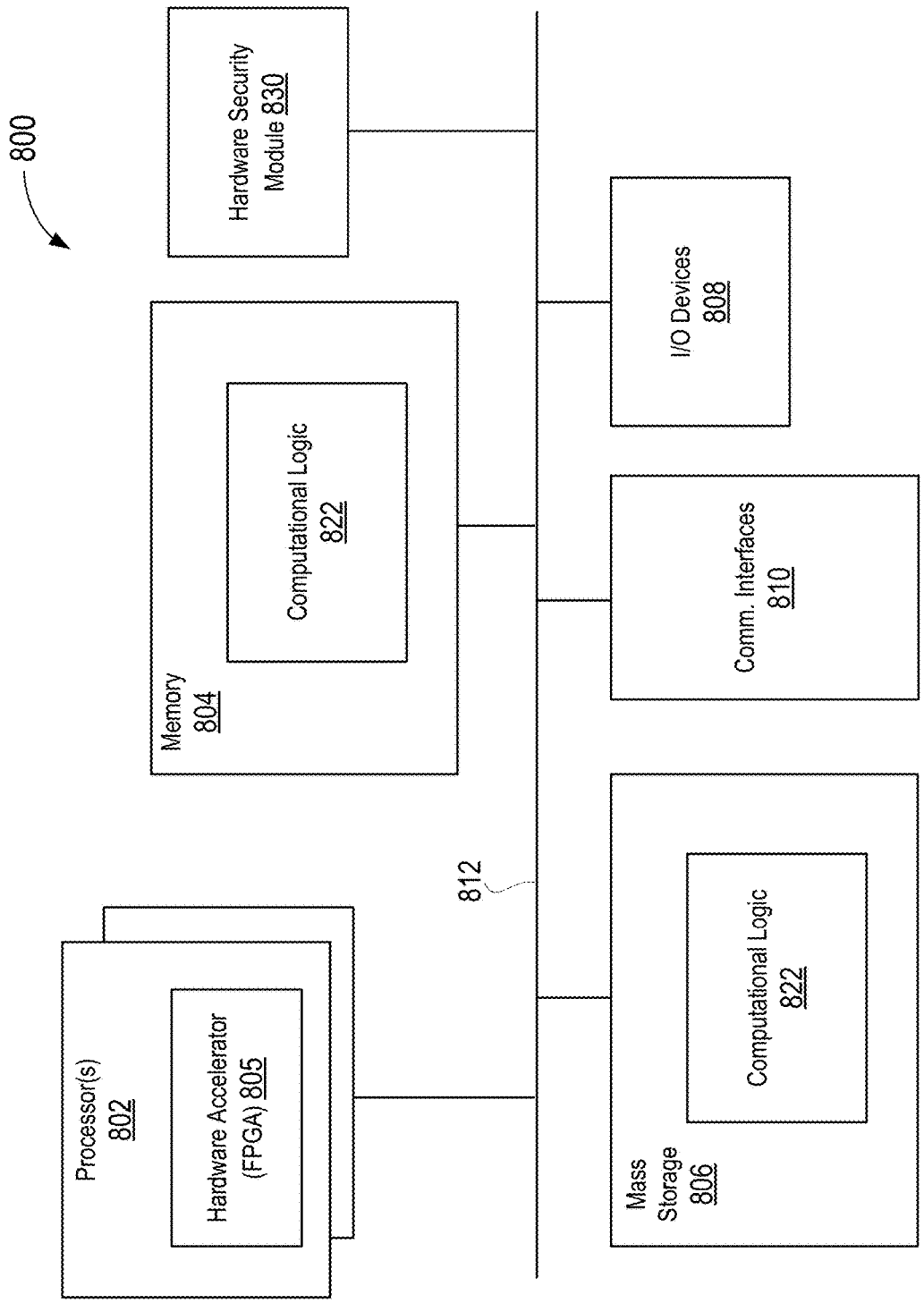
FIG. 8 illustrates a block diagram of a computer device suitable for practicing the present disclosure, in accordance with various embodiments.

Referring now to FIG. 8 wherein a block diagram of a computer device suitable for practicing the present disclosure, in accordance with various embodiments, is illustrated. Depending on the components included, computer device 800 may be used as KMS Front End 107, KMS Back End 109, CSP MN 110 and/or EP Servers 115. As shown, computer device 800 may include one or more processors 802, and system memory 804. Each processor 802 may include one or more processor cores, and optionally, hardware accelerator 805. An example of hardware accelerator 805 may include, but is not limited to, a FPGA, a GP-GPU, DSPs, neural network processors, custom AI processors, network processors or cryptographic processors, for example. In embodiments, processor 802 may also include a memory controller (not shown). In embodiments, system memory 804 may include any known volatile or non-volatile memory. Thus, System Memory 804 may include nonvolatile random access memory (NVRAM) (not shown), in addition to, or in place of, other types of RAM, such as dynamic random access memory (DRAM) (not shown), as described above.

Additionally, computer device 800 may include mass storage device(s) 806 (such as solid state drives), input/output device interface 808 (to interface with various input/output devices, such as, mouse, cursor control, display device (including touch sensitive screen), and so forth) and communication interfaces 810 (such as network interface cards, modems and so forth). In embodiments, communication interfaces 810 may support wired or wireless communication, including near field communication. The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage device(s) 806 may be employed to store a working copy and a permanent copy of the executable code of the programming instructions of an operating system, one or more applications, and/or various software implemented components of KMS 105 (including Front End 107 and Back End 109), MN 110, EPSs 115 and AFU Developers 1 though N, all of FIG. 1, collectively referred to as computational logic 822. The programming instructions implementing computational logic 822 may comprise assembler instructions supported by processor(s) 802 or high-level languages, such as, for example, C, that can be compiled into such instructions. In embodiments, some of computing logic 822 may be implemented in hardware accelerator 805.

In some embodiments, computer device 800 may also include a Hardware Security Module 830, The permanent copy of the executable code of the programming instructions or the bit streams for configuring hardware accelerator 805 may be placed into permanent mass storage device(s) 806 and/or hardware accelerator 805 in the factory, or in the field, through, for example, a distribution medium (not shown), such as a compact disc (CD), or through communication interface 810 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 810-812 may vary, depending on the intended use of example computer device 800, e.g., whether example computer device 800 is a cloud server, smartphone, tablet, ultrabook, a laptop, a server, a set-top box, a game console, a camera, and so forth, used to implement one of KMS Front End 107, KMS Back End 109, CSP MN 110 and/or EP Servers 115. The constitutions of these elements 810-812 are otherwise known, and accordingly will not be further described.

Figure 9:
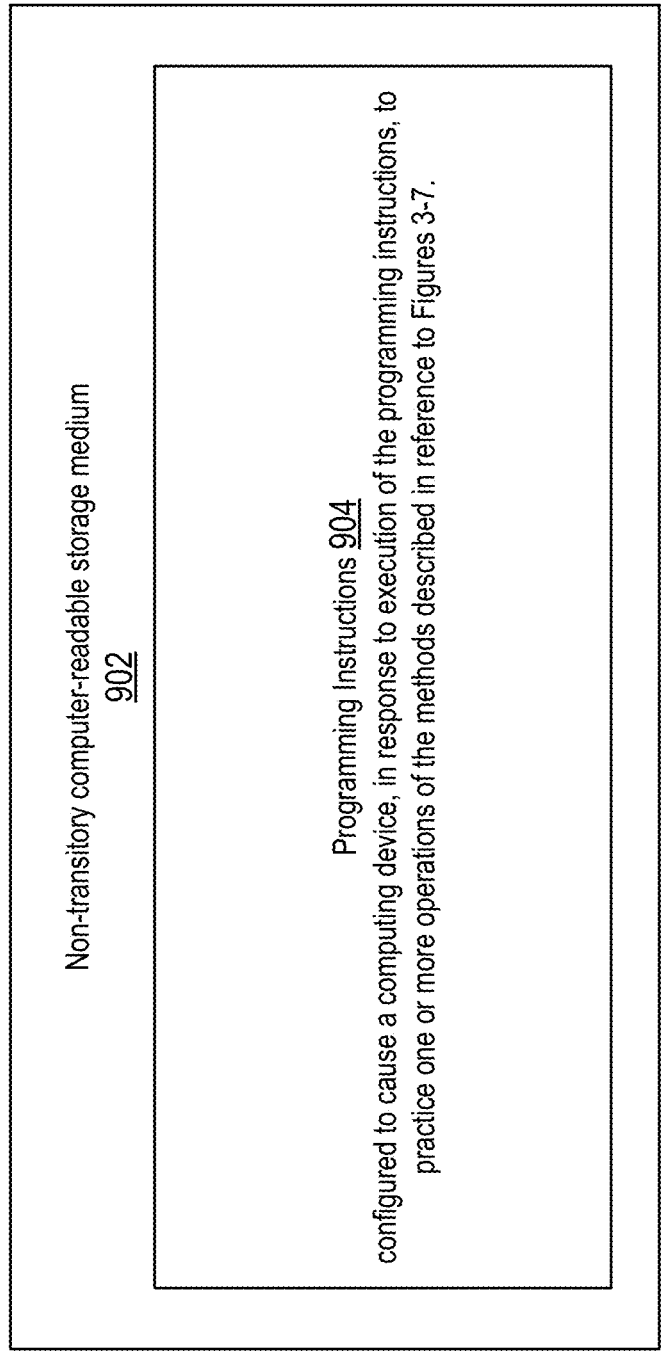
FIG. 9 illustrates an example computer-readable storage medium having instructions configured to practice aspects of the processes of FIGS. 3-7, in accordance with various embodiments.

FIG. 9 illustrates an example computer-readable storage medium having instructions configured to implement all (or a portion of) software implementations of KMS 105 (including Front End 107 and Back End 109), MN 110, EPSs 115 and AFU Developers 1 though N, all of FIG. 1, and/or practice (aspects of) processes 300 of FIG. 3, 400 of FIG. 4, 500 of FIG. 5, 600 of FIG. 6 and 700 of FIG. 7, earlier described, in accordance with various embodiments. As illustrated, computer-readable storage medium 902 may include the executable code of a number of programming instructions or bit streams 904. Executable code of programming instructions (or bit streams) 904 may be configured to enable a device, e.g., computer device 800, in response to execution of the executable code/programming instructions (or operation of an encoded hardware accelerator 805), to perform (aspects of) processes 300 of FIG. 3, 400 of FIG. 4, 500 of FIG. 5, 600 of FIG. 6 and 700 of FIG. 7. In alternate embodiments, executable code/programming instructions/bit streams 904 may be disposed on multiple non-transitory computer-readable storage medium 902 instead. In embodiments, computer-readable storage medium 902 may be non-transitory. In still other embodiments, executable code/programming instructions 904 may be encoded in transitory computer readable medium, such as signals.

Referring back to FIG. 8, for one embodiment, at least one of processors 802 may be packaged together with a computer-readable storage medium having some or all of computing logic 822 (in lieu of storing in system memory 804 and/or mass storage device 806) configured to practice all or selected ones of the operations earlier described with reference to FIGS. 3-7. For one embodiment, at least one of processors 802 may be packaged together with a computer-readable storage medium having some or all of computing logic 822 to form a System in Package (SiP). For one embodiment, at least one of processors 802 may be integrated on the same die with a computer-readable storage medium having some or all of computing logic 822. For one embodiment, at least one of processors 802 may be packaged together with a computer-readable storage medium having some or all of computing logic 822 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

EXAMPLES

Example 1 is an apparatus for cloud key management, comprising: a networking interface, and a memory; a processor, coupled to the memory and the networking interface, wherein the networking interface is to couple the apparatus to: one or more endpoint servers (EPSs) of a cloud service provider (CSP), each EPS including a hardware accelerator, and a management node (MN) of the CSP; an accelerator functional unit (AFU) developer interface module operated by the processor to receive cryptographic material (CM) for each of one or more AFU developers (AFUDs) and store it into the memory, wherein the CM includes a public key hash (PKH), and an encryption key (EK) to decrypt an AFU of the AFUD; and an EK communication module operated by the processor to: receive, from the MN, a request to send to a targeted EPS an encrypted lookup table (LUT), the LUT including PKHs and associated EKs for a set of the one or more AFUDs from which the targeted EPS is authorized to receive AFUs, and in response to the request, send, to the targeted EPS, the LUT.

Example 2 is example 1, wherein the EK is asymmetric.

Example 3 is example 1, wherein the EK communication module includes a hardware security module (HSM) to collect the associated EKs for the LUT, and send the LUT to the targeted EPS.

Example 4 is example 3, wherein the HSM sends the LUT directly to an FPGA of the hardware accelerator.

Example 5 is example 1, wherein the AFUD interface module further causes each AFUD's cryptographic material to be isolated from the cryptographic material of other AFUDs, in the memory.

Example 6 is example 1, wherein the EK communication module further receives an EPS whitelist from the MN in a mutually authenticated communication, the EPS whitelist identifying the EPSs that the EK communication module is allowed to communicate with.

Example 7 is example 5, wherein the EK communication module further determines, based at least in part on the whitelist, if it is allowed to communicate with the EPS targeted in the MN's request prior to sending the LUT to the targeted EPS.

Example 8 is example 1, wherein the EK communication module, upon receipt of the request from the MN, further verifies that the request originated from the actual MN.

Example 9 is example 1, wherein the request from the MN includes: an identifier of the targeted EPS and an authorization hash table generated by the MN that identifies a set of AFUDs whose AFUs may be potentially loaded to the targeted EPS, and an authorization PKH for each one.

Example 10 is example 9, wherein the EK communication module is further to generate the LUT by collecting, from the memory, the EKs associated with the set of AFUDs listed in the authorization hash table received from the MN.

Example 11 is example 1, wherein the EK communication module is further to encrypt the LUT with an ephemeral secret key, $K_{HSM}$.

Example 12 is example 11, wherein the wherein the EK communication module is further to: establish a mutually authenticated private tunnel with the targeted EPS in which to send the LUT, over which the $K_{HSM}$ is encrypted by a tunnel session key.

Example 13 is any one of examples 1-12, wherein the CM further includes a master key of the AFU developer, with which to decrypt the encryption key of the AFU developer.

Example 14 is one or more non-transitory computer-readable storage media comprising a plurality of bits to configure a hardware accelerator (HA) disposed in an EPS of a CSP, the EPS coupled to an MN of the CSP and a key management system (KMS) of the CSP, to: receive, at the HA, from the MN, an authorization hash table (AHT), wherein the AHT includes at least a set of public key hashes of AFUDs whose AFUs are authorized to be run on the HA; store the AHT on the HA; determine, as to each AFUD identified in the AHT, if the HA has a stored EK with which to decrypt an AFU of the AFUD; and in response to a determination that it does not have the EK, request the EK for the AFUD from the MN.

Example 15 is the one or more non-transitory computer-readable storage media of example 14, and/or other example herein, wherein the AHT is signed by the MN.

Example 16 is the one or more non-transitory computer-readable storage media of example 14, and/or other example herein, wherein the AHT is replay protected.

Example 17 is the one or more non-transitory computer-readable storage media of example 14, and/or other example herein, wherein the AHT further comprises version data for each AFUD, to support multiple EKs per AFUD.

Example 18 is the one or more non-transitory computer-readable storage media of example 14, and/or other example herein, further comprising instructions that in response to being executed cause the HA to: establish a mutually authenticated private tunnel with the KMS; and receive, through the private tunnel, an encrypted LUT from the KMS, the LUT including public key hashes and associated EKs for AFUs for a set of one or more AFUDs from which the HA is authorized to receive AFUs.

Example 19 is the one or more non-transitory computer-readable storage media of example 18, and/or other example herein, wherein the encrypted LUT is encrypted with an ephemeral secret key, $K_{HSM}$, and wherein the $K_{HSM}$ is encrypted by a tunnel session key of the private tunnel.

Example 20 is the one or more non-transitory computer-readable storage media of example 18, and/or other example herein, further comprising instructions that in response to being executed cause the HA not to expose the LUT outside the HA.

Example 21 is any one of the one or more non-transitory computer-readable storage media of examples 14-20, and/or other example herein, wherein the HA is a FPGA.

Example 22 is a method, performed by a MN of a CSP, the MN coupled over a network to a KMS and to one or more EPSs of the CSP, comprising:generating, by the MN, a whitelist, the whitelist to indicate a set of the one or more EPSs that the KMS, coupled over the network to the one or more EPSs, is allowed to send an EK to, the EK to be used to decrypt associated encrypted AFUs to be respectively provided to the CSP by AFUDs, the AFUs to program a HA disposed in each EPS identified in the set; and transmitting, by the MN, the whitelist to the KMS.

Example 23 is the method of example 22, and/or other example herein, wherein the whitelist includes, for each identified EPS: a device PKH for the HA disposed in the EPS; a socket identifier for the HA; a node identifier for the EPS; and a server network location identifier for the EPS.

Example 24 is the method of example 22, and/or other example herein, further comprising: constructing a AHT, including: a PKH for each AFUD from whom AFUs and respectively associated EKs may be loaded to a HA of an EPS, and version data regarding the AFUD; signing the AHT; and distributing the AHT to the EPS.

Example 25 is any one of the methods of examples 22-24, and/or other example herein, wherein the AHT includes version data to allow multiple EKs for respective AFUs from the same AFUD to be loaded on the HA disposed in the EPS.

Example 26 is an apparatus for computing, comprising: means for interfacing to a network, and a storage means; processing means coupled to the storage means and the means for interfacing to a network, wherein the means for interfacing to a network is to couple the apparatus for computing to: one or more endpoint servers (EPSs) of a cloud service provider (CSP), each EPS including a hardware accelerator, and a management node (MN) of the CSP; an accelerator functional unit (AFU) developer interface module operated by the processing means to receive cryptographic material (CM) for each of one or more AFU developers (AFUDs) and store it into the storage means, wherein the CM includes a public key hash (PKH), and an encryption key (EK) to decrypt an AFU of the AFUD; and an EK communication module operated by the processing means to: receive, from the MN, a request to send to a targeted EPS an encrypted lookup table (LUT), the LUT including PKHs and associated EKs for a set of the one or more AFUDs from which the targeted EPS is authorized to receive AFUs, and in response to the request, send, to the targeted EPS, the LUT.

Example 27 is example 26, wherein the EK is asymmetric.

Example 28 is example 26, wherein the EK communication module includes a hardware security module (HSM) to collect the associated EKs for the LUT, and send the LUT to the targeted EPS.

Example 29 is example 28, wherein the HSM sends the LUT directly to an FPGA of the hardware accelerator.

Example 30 is example 26, wherein the AFUD interface module further causes each AFUD's cryptographic material to be isolated from the cryptographic material of other AFUDs, in the storage means.

Example 31 is example 26, wherein the EK communication module further receives an EPS whitelist from the MN in a mutually authenticated communication, the EPS whitelist identifying the EPSs that the EK communication module is allowed to communicate with.

Example 32 is example 30, wherein the EK communication module further determines, based at least in part on the whitelist, if it is allowed to communicate with the EPS targeted in the MN's request prior to sending the LUT to the targeted EPS.

Example 33 is example 26, wherein the EK communication module, upon receipt of the request from the MN, further verifies that the request originated from the actual MN.

Example 34 is example 26, wherein the request from the MN includes: an identifier of the targeted EPS and an authorization hash table generated by the MN that identifies a set of AFUDs whose AFUs may be potentially loaded to the targeted EPS, and an authorization PKH for each one.

Example 35 is example 34, wherein the EK communication module is further to generate the LUT by collecting, from the storage means, the EKs associated with the set of AFUDs listed in the authorization hash table received from the MN.

What is claimed is:

1. An apparatus for cloud key management, comprising:
    a networking interface, and a memory;
    a processor, coupled to the memory and the networking interface, wherein the networking interface is to couple the apparatus to: one or more endpoint servers (EPSs) of a cloud service provider (CSP), each EPS including a hardware accelerator, and a management node (MN) of the CSP;
    an accelerator functional unit (AFU) developer interface module operated by the processor to receive cryptographic material (CM) for each of one or more AFU developers (AFUDs) and store it into the memory, wherein the CM includes a public key hash (PKH), and an encryption key (EK) to decrypt an AFU of the AFUD; and
    an EK communication module operated by the processor to:
    receive, from the MN, a request to send to a targeted EPS an encrypted lookup table (LUT), the LUT including PKHs and associated EKs for a set of the one or more AFUDs from which the targeted EPS is authorized to receive AFUs, and
    in response to the request, send, to the targeted EPS, the LUT.

2. The apparatus of claim 1, wherein the EK is asymmetric.

3. The apparatus of claim 1, wherein the EK communication module includes a hardware security module (HSM) to collect the associated EKs for the LUT, and send the LUT to the targeted EPS.

4. The apparatus of claim 3, wherein the HSM sends the LUT directly to an FPGA of the hardware accelerator.

5. The apparatus of claim 1, wherein the AFU developer interface module further causes each AFUD's cryptographic material to be isolated from the cryptographic material of other AFUDs, in the memory.

6. The apparatus of claim 1, wherein the EK communication module further receives an EPS whitelist from the MN in a mutually authenticated communication, the EPS whitelist identifying the EPSs that the EK communication module is allowed to communicate with.

7. The apparatus of claim 6, wherein the EK communication module further determines, based at least in part on the whitelist, if it is allowed to communicate with the EPS targeted in the MN's request prior to sending the LUT to the targeted EPS.

8. The apparatus of claim 1, wherein the EK communication module, upon receipt of the request from the MN, further verifies that the request originated from the actual MN.

9. The apparatus of claim 1, wherein the request from the MN includes:
    an identifier of the targeted EPS and an authorization hash table generated by the MN that identifies a set of AFUDs whose AFUs may be potentially loaded to the targeted EPS, and
    an authorization PKH for each one.

10. The apparatus of claim 9, wherein the EK communication module is further to generate the LUT by collecting, from the memory, the EKs associated with the set of AFUDs listed in the authorization hash table received from the MN.

11. The apparatus of claim 1, wherein the EK communication module is further to encrypt the LUT with an ephemeral secret key, $K_{HSM}$.

12. The apparatus of claim 11, wherein the EK communication module is further to:
    establish a mutually authenticated private tunnel with the targeted EPS in which to send the LUT, over which the $K_{HSM}$ is encrypted by a tunnel session key.

13. The apparatus of claim 1, the CM further including a master key of the AFU developer, with which to decrypt the encryption key of the AFU developer.

\* \* \* \* \*